United States Patent Office 2,891,949
Patented June 23, 1959

2,891,949
SULFAPYRIMIDINES AND METHODS OF PREPARING THE SAME

John S. Webb, Woodcliff Lake, N.J., and George H. Schneller, Devon, Pa., assignors to American Cyanamid Company, New York, N.Y., a corporation of Maine No Drawing. Application May 10, 1956
Serial No. 583,896

6 Claims. (Cl. 260—239.75)

This invention relates to new organic compounds. More particularly, it relates to $N^1$-acylated sulfapyrimidines and methods of preparing the same.

The $N^4$-acyl sulfapyrimidines are well known, having been described by Roblin and Winnek, U.S. Patent 2,410,793, and by others. These compounds were intermediates for the preparation of such sulfa drugs as sulfadiazine, sulfamerazine, sulfamethazine and the like and do not in themselves possess useful antibacterial activity. On the other hand, the $N^1$-acylated sulfapyrimidines of the present invention are used as such, and one of their principal properties is the fact that they retain their antibacterial activity while being comparatively tasteless. These properties are highly desirable, since drugs such as sulfamethazine, when fed to animals or human beings, have a tendency to impart a bitter taste to food or water in which they are given. Because of the bitter taste, the animals will consume the medicated food or water sparingly or not at all.

The compounds of the present invention may be illustrated by the following general formula:

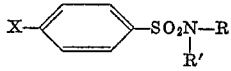

in which X is a carbobenzoxyamino, amino or nitro radical, R is a pyrimidine radical and R' is an alkanoyl radical. The radical R' can be an acetyl, propionyl, butyryl, valeryl, caproyl, etc. radical. The radical R can be a pyrimidine, such as methylpyrimidine, dimethylpyrimidine or pyrimidine itself.

The $N^1$-acyl compounds of the present invention are useful as antibacterial agents for combating gram positive and gram negative bacteria. The following Tables I and II show a comparison of the activity of compounds such as $N^1$-acetylsulfamethazine with other known $N^1$-acylsulfonamides when treating Streptococcus infections.

TABLE I

Comparison of sulfamethazine, gantrisin and $N^1$–acetyl gantrisin in the Streptococcus Strain AC203 infection in CF1 mice

SULFAMETHAZINE

| Percent Drug in Diet | Drug Intake, Mg./kg./day | Survival Ratio a | Percent Effect |
|---|---|---|---|
| 0.1 | 170 | 9/10 | 90 |
| 0.05 | 90 | 3/10 | 30 |
| 0.025 | 22 | 0/10 | 0 |
| 0.0125 | 7 | 0/10 | 0 |
| 0.006 | 3 | 0/10 | 0 |

GANTRISIN—3,4 - DIMETHYL - 5 - SULFANILAMIDOISOXAZOLE

| | | | |
|---|---|---|---|
| 0.4 | 680 | 10/10 | 100 |
| 0.2 | 320 | 8/10 | 80 |
| 0.1 | 160 | 2/10 | 20 |
| 0.05 | 40 | 0/10 | 0 |
| 0.025 | 10 | 0/10 | 0 |

TABLE I—Continued $N^1$ - ACETYL GANTRISIN—$N^1$ - ACETYL - 3,4 - DIMETHYL 5 - SULFANILAMIDOISOXAZOLE

| | | | |
|---|---|---|---|
| 0.2 | 270 | 3/10 | 30 |
| 0.05 | 10 | 0/10 | 0 |
| 0.0125 | 3 | 0/10 | 0 |
| Infected Controls | | 0/20 | 0 | a Survival ratio=number of mice alive/total mice tested, as of the 21st day after infection.

TABLE II

A comparison of the effectiveness of sulfamethazine and $N^1$-acetylsulfamethazine orally in the Streptococcus Strain C203 infection in CF1 mice a

SULFAMETHAZINE

| Percent Drug in Diet | Drug Intake,b Mg./kg./day | Survival Ratio c | Percent Effect |
|---|---|---|---|
| 0.2 | 410 | 38/40 | 95 |
| 0.1 | 200 | 31/40 | 78 |
| 0.05 | 85 | 14/40 | 35 |
| 0.025 | 38 | 9/40 | 23 |
| 0.012 | 12 | 0/40 | 0 |

Median effective dose=95 (75–120) mg./kg./day.

$N^1$-ACETYLSULFAMETHAZINE

| | | | |
|---|---|---|---|
| 0.4 | 830 | 20/20 | 100 |
| 0.2 | 370 | 37/40 | 93 |
| 0.1 | 200 | 33/39 | 85 |
| 0.05 | 90 | 19/40 | 48 |
| 0.025 | 36 | 3/30 | 10 |
| 0.012 | 9 | 0/20 | 0 |

Median effective dose=100 (78–130) mg./kg./day.
Untreated Infected Controls — 0/60 — 0 a The procedure used for this comparison of antibacterial activity is described in Antibiotics and Chemotherapy 2, 659 (1952).
b Each drug intake value is an average based on from 2 to 4 tests; in each test there were 10 mice per drug-diet level.
c Survival ratio=number of mice alive/total mice tested, as of the 21st day after infection.

The above tables show that the results obtained at 0.2% $N^1$-acetylsulfamethazine were markedly superior to 0.2% $N^1$-acetyl gantrisin. At the 0.05% level, $N^1$-acetylsulfamethazine showed survival of one-half the test animals, whereas $N^1$-acetyl gantrisin showed no survivals.

The compounds of the present invention are preferably prepared by protecting the $N^4$-position of the sulfa drug with a blocking group which can be removed by non-hydrolytic means. The $N^4$-substituted sulfa drug is then acylated in the $N^1$-position and the blocking group in the $N^4$-position is removed by a non-hydrolytic reaction, such as the catalytic reduction of a carbobenzoxy group. Following completion of the reaction indicated by cessation of the reaction mixture to take up hydrogen, the catalyst is separated by filtration. The product is further purified by recrystallization.

The present compounds can also be prepared where X is, for example, a nitro group by direct acylation in the $N^1$-position and then catalytic reduction of the nitro group to an amino radical. The product can then be purified by recrystallization or by other means well known to those skilled in the art.

In preparing the $N^1$-acylsulfapyrimidines of the present invention, two different classes of intermediates can be used. The choice of intermediate is determined by the process used. As described above, representative of the two groups are those intermediates containing in the 4-position a group reducible to amino, such as a nitro group, and those having a protected amino group, such as a carbobenzoxy, removable by non-hydrolytic means.

The compounds of the present invention can be used in the form of tablets, pills, powders, etc., which may also contain starch, excipients and other ingredients necessary to the compounding of such dosage forms. They may also be used singly or in combination with other sulfa drugs or with antibiotics in liquid preparations to which they are especially suited because of their comparative tastelessness.

The following examples illustrate the preparation of representative compounds of the present invention.

EXAMPLE 1

To a solution of 61.2 parts of carbobenzoxy chloride in toluene was added a solution of 90 parts of sodium sulfamethazine in 150 parts of water. To this mixture was added dropwise, with stirring, 5 N sodium hydroxide to a definite pink spot on benzoazurine indicator paper. The temperature was maintained at 35°–40° C. throughout the addition. The reaction mixture was stirred for one hour, whereupon a jelly-like precipitate resulted. An additional 20% molar equivalent of carbobenzoxy chloride in toluene was added, resulting in a clear solution, which was allowed to stand overnight. The following day, the toluene layer was separated, and the aqueous solution was titrated with N/10 sodium nitrite to determine the amount of unreacted sulfamethazine still present. Additional amounts of carbobenzoxy chloride in toluene and 5 N sodium hydroxide were added as required until the N/10 sodium nitrite titration showed practically all of the sulfamethazine was reacted. The total amount of carbobenzoxy chloride used was 209.1 parts. The aqueous solution was then acidified with acetic acid, whereupon a gummy precipitate resulted. On standing, the product became crystalline and was then separated by filtration and washed with water. Upon drying at 100° C., there was obtained 109 parts of crude $N^4$-carbobenzoxysulfamethazine melting at 177.0° C.–183.0° C.

The crude product was slurried in 500 parts of cold water and made alkaline to a pink spot on benzoazurine indicator paper with 5 N sodium hydroxide. A small amount of ethyl alcohol was added, and the solid dissolved upon heating to 40° C. The solution was then poured into 675 parts of 0.11 N hydrochloric acid, resulting in a solid gummy mass, which was triturated in a mortar with pestle until crystalline. The product was separated by filtration and washed with water. Upon drying at 100° C., there was obtained 106 parts, melting at 178.0°–184.0° C. After one recrystallization from 90% acetone, there was obtained 56 parts of white $N^4$-carbobenzoxysulfamethazine, melting at 189.0°–190.0° C.

A mixture of 16.3 parts of $N^4$-carbobenzoxysulfamethazine and 30 parts by volume of acetic anhydride was heated to reflux, resulting in a clear solution. Refluxing was continued for one hour. The reaction mixture was then allowed to stand over the weekend, whereupon the product crystallized. This was then separated by filtration and washed with ether. After two recrystallizations from 40 parts by volume of acetonitrile there was obtained 9 parts of $N^1$-acetyl-$N^4$-carbobenzoxysulfamethazine as a white product, melting at 180.0°–182.0° C.

EXAMPLE 2

Three parts of $N^1$-acetyl-$N^4$-carbobenzoxysulfamethazine with 2 parts of 10% palladium on charcoal catalyst in 200 parts by volume of acetic acid was hydrogenated in the usual manner. The catalyst was separated by filtration, and the mother liquor was reduced to about ¼ volume on a water bath under reduced pressure. The product crystallized on cooling, was separated by filtration and washed with ether. After one recrystallization from acetone, there was obtained $N^1$-acetylsulfamethazine as a white product, melting at 196.5° C.–198.5° C.

EXAMPLE 3

A mixture of 61.6 parts of $N^1$-(4,6-dimethyl-2-pyrimidyl) - 4 - nitrobenzene sulfonamide, 200 parts dry pyridine and 800 parts methyl ethyl ketone was heated to solution at 35° C. To this solution was added dropwise, over a period of 15 minutes, a total of 23.52 parts of acetyl chloride maintaining the temperature at 45–50° C. The reaction mixture was then heated at reflux for ½ hour. The product crystallized on cooling and was separated by filtration and washed with water. The product was air dried and then recrystallized from methyl ethyl ketone. Upon drying at 50° C., there was obtained 46 parts of $N^1$-acetyl-$N^1$-(4,6 - dimethyl - 2 - pyrimidyl) - 4 - nitrobenzene sulfonamide.

EXAMPLE 4

$N^1$-acetyl-$N^1$-(4,6-dimethyl-2-pyrimidyl)-4 - nitrobenzene-sulfonamide, 8 parts, and 2 parts of 10% palladium on charcoal catalyst in 250 parts of acetic acid were hydrogenated in the usual manner. The catalyst cake was separated by filtration, and the mother liquor was reduced to about ⅓ volume on a water bath under reduced pressure. The product crystallized on cooling, was separated by filtration and washed with ether. After one recrystallization from ether, there was obtained $N^1$-acetyl-sulfamethazine as a white product, melting at 191.5° C.–192.5° C.

EXAMPLE 5

A mixture of 70 parts of $N^1$-(4,6 - dimethyl-2 - pyrimidyl)-4-nitrobenzenesulfonamide and 45.4 parts by volume of 5 N sodium hydroxide with 100 cc. of water was heated on a steam bath with stirring to obtain complete solution. The solution was then chilled and filtered, and the sodium salt of $N^1$-(4,6-dimethyl-2-pyrimidyl)-4-nitrobenzenesulfonamide dried under reduced pressure, yielding 68.3 parts (91.5%).

A mixture of 19.2 parts of the above sodium salt, 32 parts of acetone, 4.6 parts of pyridine and 15.3 parts of acetic anhydride was stirred and warmed slowly to 50° C. on a steam bath. At about 45° C. a change to a lighter yellow solid took place. The reaction was slightly exothermic. The reaction mixture was allowed to stand overnight and then it was filtered. The filter cake was suspended successively in ice-cold 58-part portions of (a) 3% ammonia, (b) 1% ammonia, (c) water, and the washed solid was dried in air. The crude product (17 parts) was recrystallized from methyl ethyl ketone to give 14 parts (82.5%) of $N^1$-acetyl-$N^1$-(4,6-dimethyl-2-pyrimidyl)-4-nitrobenzenesulfonamide, a pale yellow granular solid, melting point 215.5° C. to 217.5° C.

EXAMPLE 6

A mixture of 8 parts of $N^1$-acetyl-$N^1$-(4,6-dimethyl-2-pyrimidyl)-4-nitrobenzenesulfonamide, 250 parts of acetic acid and 2 parts of 10% palladium on carbon was hydrogenated starting at 40 lbs. per square inch pressure of hydrogen. The pressure drop indicated the absorption of the theoretical amount of hydrogen in 30 minutes. The mixture was partially evaporated under reduced pressure, filtered and a white product crystallized. Recrystallization of this product from acetonitrile gave 3.48 parts of $N^1$-acetyl-$N^1$-(4,6-dimethyl-2 - pyrimidyl) - sulfanilamide, having a melting point of 201.5° C.–203.0° C. when dried in air.

The acylation reaction of the present invention can be carried out at a temperature of from room temperature (25° C.) to about 150° C. The reaction temperature will depend upon the constitution of the reaction mixture. When at least some of the reactants are liquid, an additional solvent is usually not necessary. Under other conditions, it may be desirable to have present a solvent such as pyridine, acetone, methyl ethyl ketone, etc. It is usually desirable to complete the reaction by heating the reaction mixture to refluxing temperatures. At the temperature range indicated above, the reaction is complete in from a few minutes to 10 or 12 hours, depending upon the particular temperature used. The foregoing examples illustrate in detail the reaction conditions.

The hydrogenation reaction to remove the carbobenzoxy group or convert the nitro group to an amino radical

We claim:
1. A compound of the group having the formula

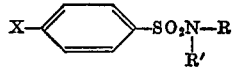

in which X is a member of the group consisting of carbobenzoxyamino, amino and nitro, R is a pyrimidine radical having the carbon atom between the two nitrogen atoms of the pyrimidine attached to the nitrogen atom of the sulfonamide group and when substituted the pyrimidine radical contains not more than two methyl groups and R' is a lower alkanoyl radical.

2. $N^1$-lower alkanoyl-$N^1$-(4,6-dimethyl-2-pyrimidyl)-sulfanilamide.

3. $N^1$-acetyl-$N^1$-(4,6-dimethyl-2-pyrimidyl)-sulfanilamide.

4. $N^1$-acetyl-$N^4$-carbobenzoxy-$N^1$-(4,6-dimethyl-2-pyrimidyl)-sulfanilamide.

5. $N^1$-acetyl-(4,6-dimethyl-2-pyrimidyl)-4-nitrobenzenesulfonamide.

6. A chemical compound of the formula:

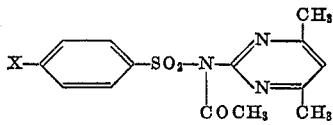

wherein X is selected from the group consisting of amino and nitro.

References Cited in the file of this patent
FOREIGN PATENTS

| | | |
|---|---|---|
| 555,865 | Great Britain | Sept. 10, 1943 |
| 569,157 | Great Britain | May 10, 1945 |

OTHER REFERENCES

S. Rajagopalan: Proc. Ind. Acad. Sci., 18A, 108 (1943).
Fuson: Adv. Org. Chem., p. 261, Wiley (1950).
Chemical Abstracts Index of vol. 41 (1947), page 8991 [abstract of Brit. Pat. 569,157].

UNITED STATES PATENT OFFICE

CERTIFICATE OF CORRECTION

Patent No. 2,891,949                                                                  June 23, 1959

John S. Webb et al.

It is hereby certified that error appears in the printed specification of the above numbered patent requiring correction and that the said Letters Patent should read as corrected below.

Column 1, lines 52 and 53, for "gantrisin and $N^1$-acetyl gantrisin", in italics, read -- 3,4-dimethyl-5-sulfanilamidoisoxazole and $N^1$-acetyl-3,4-dimethyl-5-sulfanilamidoisoxazole -- in italics; line 66, strike out "GANTRISIN"; column 2, line 3, strike out "$N^1$-ACETYL GANTRISIN"; lines 42 and 44, for "$N^1$-acetyl gantrisin", each occurrence, read -- $N^1$-acetyl-3,4-dimethyl-5-sulfanilamidoisoxazole --.

Signed and sealed this 15th day of December 1959.

(SEAL)
Attest:

KARL H. AXLINE
Attesting Officer

ROBERT C. WATSON
Commissioner of Patents